Figure 12:
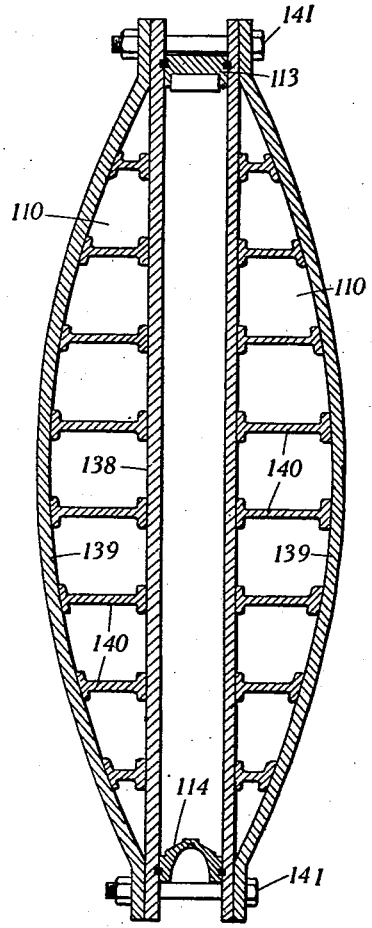
Figure 15:
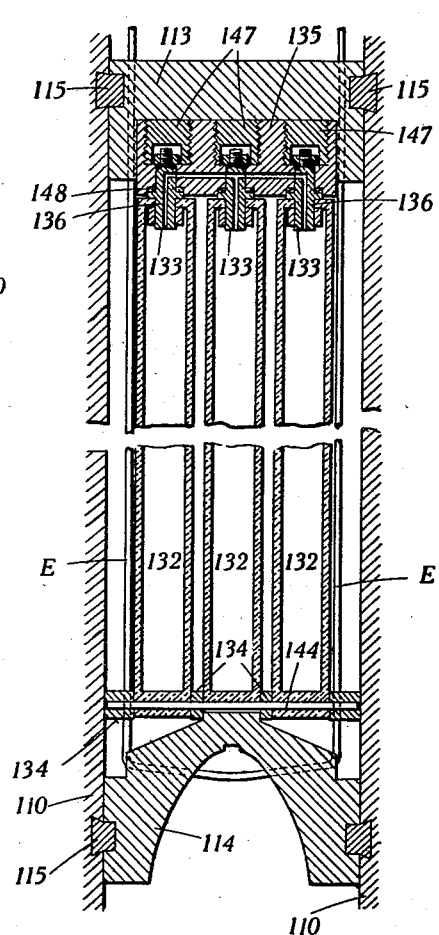

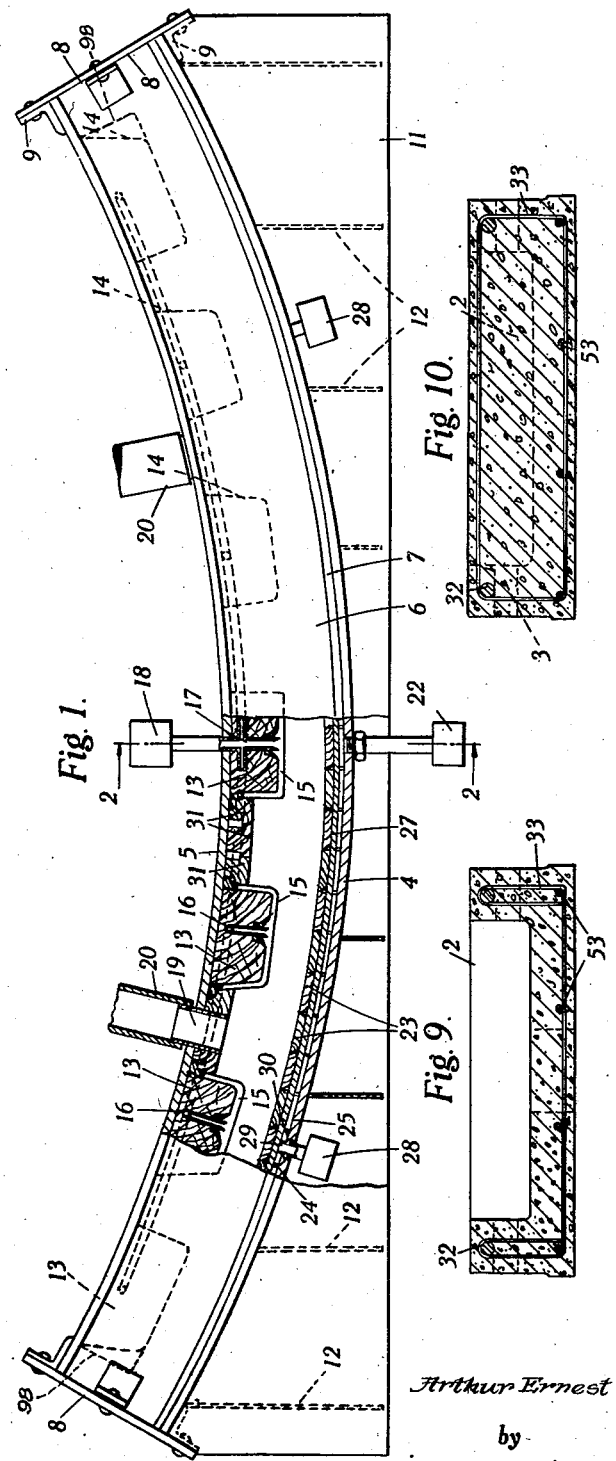

April 9, 1940. A. E. RUEGG 2,196,874
CONCRETE MOLDING APPARATUS
Filed Nov. 8, 1938 5 Sheets-Sheet 2
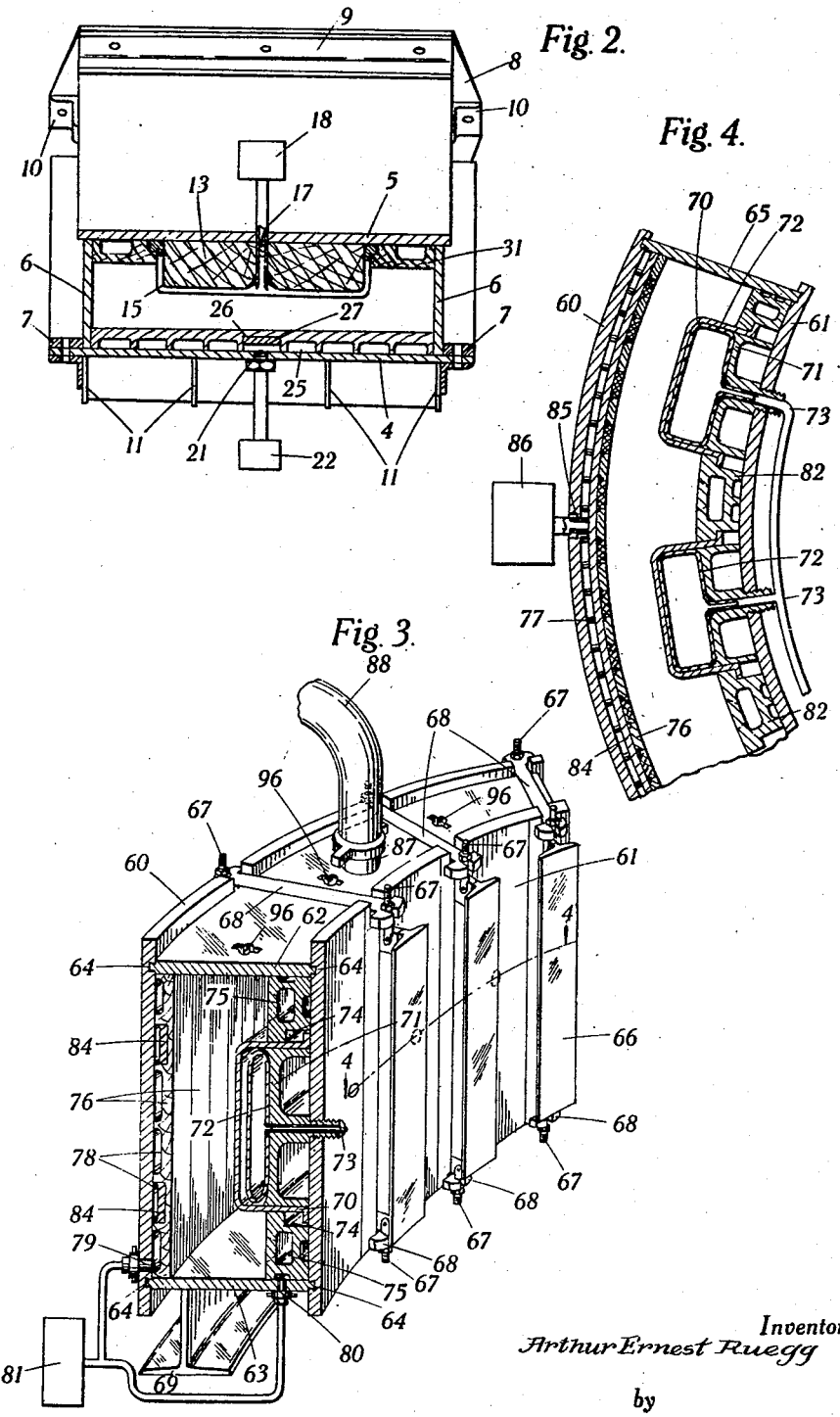

April 9, 1940.  A. E. RUEGG  2,196,874
CONCRETE MOLDING APPARATUS
Filed Nov. 8, 1938   5 Sheets-Sheet 3
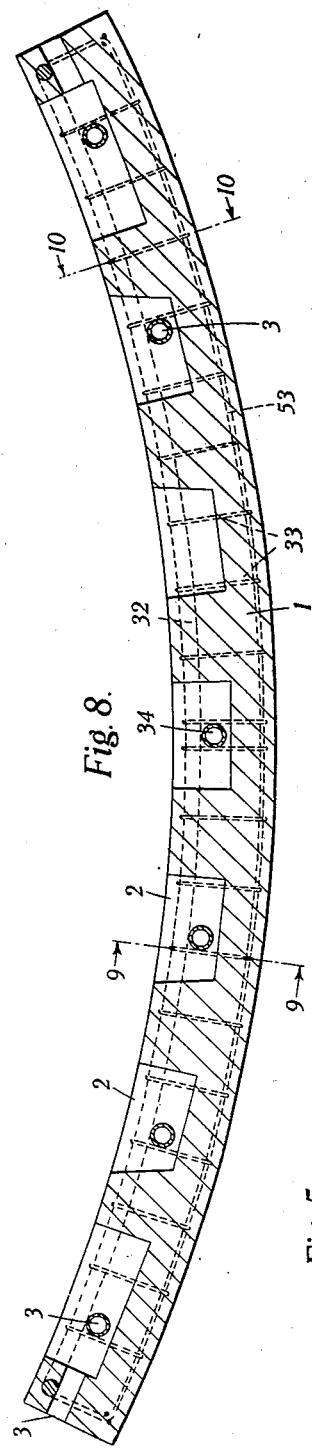
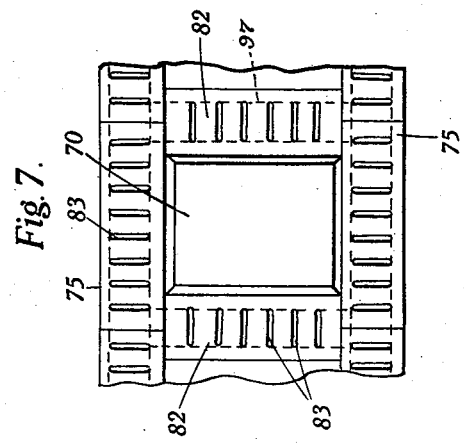
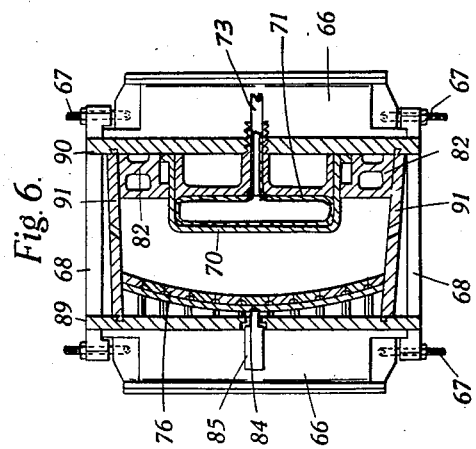
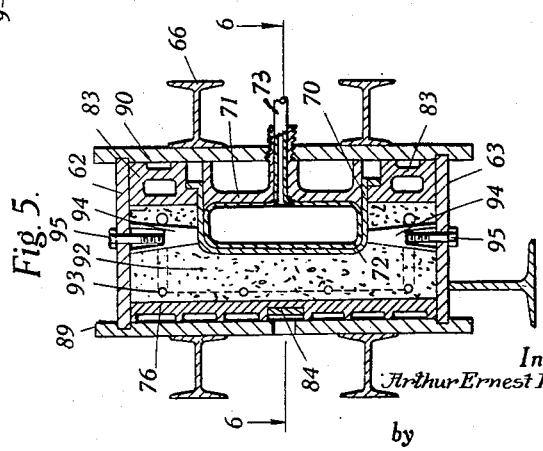
Inventor
Arthur Ernest Ruegg
by
Munn, Anderson & Liddy
Attorneys April 9, 1940.   A. E. RUEGG   2,196,874
CONCRETE MOLDING APPARATUS
Filed Nov. 8, 1938   5 Sheets-Sheet 4
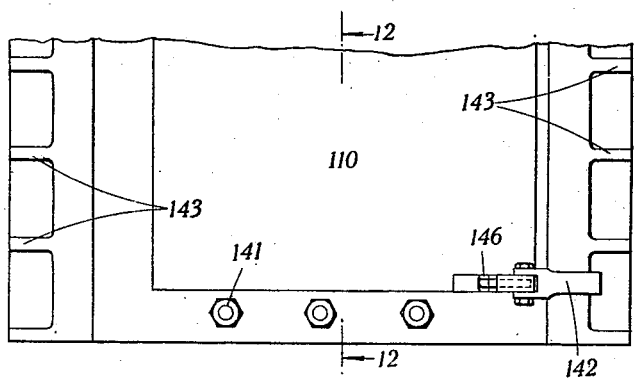
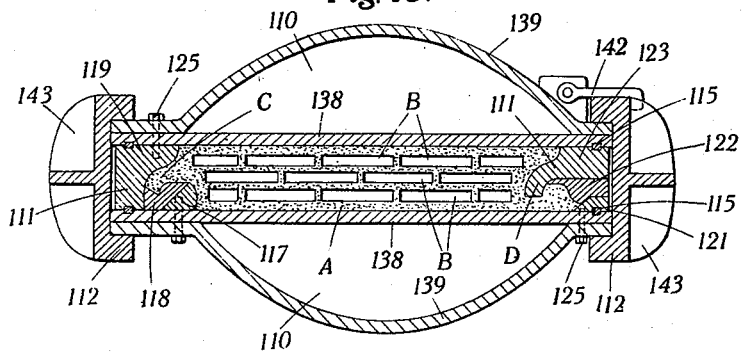
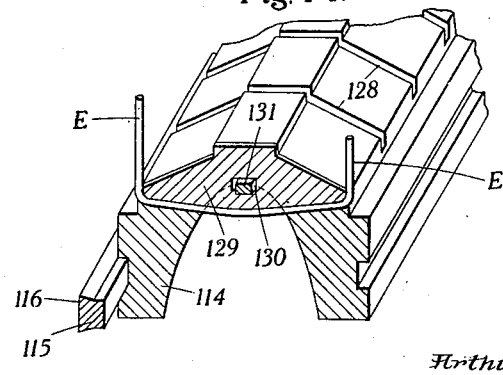
Inventor
Arthur Ernest Ruegg
by
Munn, Anderson & Liddy
Attorneys April 9, 1940.  A. E. RUEGG  2,196,874
CONCRETE MOLDING APPARATUS
Filed Nov. 8, 1938   5 Sheets-Sheet 5

Inventor
Arthur Ernest Ruegg
by
Munn, Anderson & Liddy
Attorneys

Patented Apr. 9, 1940

2,196,874

UNITED STATES PATENT OFFICE 2,196,874

CONCRETE MOLDING APPARATUS

Arthur Ernest Ruegg, London, England, assignor of one-half to Rudolf Otto Alfred Haccius, London, England Application November 8, 1938, Serial No. 239,518
In Great Britain December 8, 1936

6 Claims. (Cl. 25—41)

This invention relates to the molding of concrete and is directed towards the production of articles of great strength for which it is necessary to have great density of concrete.

An object of the invention is to provide a method of manufacturing concrete blocks rapidly and simply without incurring undue expense so that they will have a greater ultimate compressive stress than blocks made heretofore. The blocks are made in molds which on completion of the process are dismantled for removal of the finished block.

It is another object of the present invention to provide an improved method of molding concrete articles in which the concrete in the mold is subjected to the combined effects of compression, suction and vibration which serves to free and withdraw occluded air and excess water and to compact the concrete to a form which is exceedingly strong and impervious.

It is a further object of the invention to subject the concrete to a steady compression by applying pressure to movable cores defining recesses in the articles and simultaneously to vibrate the concrete by subjecting a mold lining to vibrating impulses and to withdraw excess water by applying suction through the mold lining.

Another object of the invention is to provide apparatus for forming recessed concrete articles in which the recesses are defined by cores comprising rigid, movable members which are subjected to the action of fluid pressure to enlarge the core and thus compress the concrete in the mold.

A still further object of the invention is to manufacture arcuate recessed reinforced concrete blocks suitable for the formation of tunnel linings by casting them in a mold which is provided with movable cores on one arcuate wall and with a lining through which excess liquid can be drawn on the opposite arcuate wall, the lining also serving as the means by which vibrations are transmitted to the concrete in the mold by providing one or more vibratable pins or like members which project through the mold wall onto a member or members which extend transversely of, and bear on, the mold lining.

Another object of the invention is to form arcuate tunnel-lining blocks, which have hitherto been formed of metal, of reinforced concrete. The blocks are provided with recesses opening onto the inner curved side, thus leaving walls at the sides and ends through which bolt holes, for connecting adjacent blocks together, are provided.

Other objects and advantages of the present invention will be disclosed in the following description and accompanying drawings forming a part of this specification, the new or improved features, arrangements and combinations of which form parts of the invention.

In the drawings—

Figure 16:
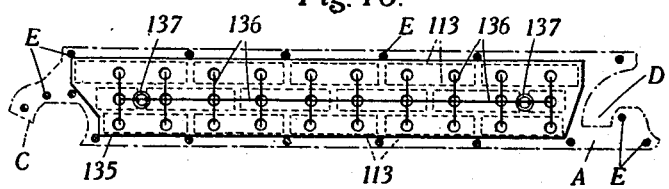

Fig. 1 is a side elevational view, partly in section, of an arcuate mold for forming a recessed block in which the outer curve forms the base of the block, Fig. 2 is a vertical cross-section through the block shown in Fig. 1 on the line 2—2, with certain parts omitted, Fig. 3 is a fragmentary perspective view of a modified construction of arcuate mold, positioned on edge, with part shown in vertical section and parts omitted for clearness, Fig. 4 is a fragmentary circumferential section on the line 4—4 of the mold shown in Fig. 3, Fig. 5 is a vertical section through a mold with parts omitted and showing modified details, Fig. 6 is a section on the line 6—6 of Fig. 5, Fig. 7 is a fragmentary face view of a core and lining blocks, Fig. 8 is a longitudinal section through a completed block formed in the mold shown in Figs. 1 and 2, Figs. 9 and 10 are cross-sections on the lines 9—9 and 10—10 respectively of Fig. 8, Fig. 11 is a partial elevation of the front of a modified mold for use in making concrete blocks by the method of the present invention, Fig. 12 is a cross-section through the full length of the mold along the line 12—12 shown in Fig. 11, Fig. 13 is a transverse section of the mold shown in Fig. 11, and shows a cross-section of a completed block therein, Fig. 14 is an enlarged perspective view of a detail of the mold in Figs. 11 to 13, Fig. 15 is a partial cross-section of the mold drawn to a larger scale and showing the cores and reinforcing steel in place and other details, and Fig. 16 is a diagrammatic plan of the pressure manifold of the mold drawn to a reduced scale and indicating an arrangement for distributing the pressure to the cores within the mold.

Like reference numerals refer to similar parts throughout the several figures of the drawings.

Referring first to Figs. 1 and 2 and 8 to 10, the mold is arranged to form an arcuate block 1 which is somewhat similar in shape to the cast iron segments commonly used in tube railway construction, but instead of being of channel section they are of rectangular section and are formed with a number of recesses 2 extending from the inner curve at intervals throughout the length of the block to enable bolt holes 3 to be provided at the ends and sides.

The dimensions and curve of the mold are such that it produces a block which is substantially one sixth of a circle, six similar blocks, with a short closing key piece, are arranged to form a complete circle.

The mold shown in Figs. 1 and 2 for the purpose of illustration comprises a curved base plate 4 which forms the outer curve of the block and a curved upper plate 5 which forms the inner curve of the block.

In the form shown the sides 6 of the mold are permanently secured to the top plate 5 so as to form a cover of generally channel section as shown in Fig. 2, with the top 5 as the web and the sides 6 as the flanges thereof.

The sides 6 are provided with flanges which are bolted or otherwise secured to the base plate 4.

The ends of the mold are each shown closed by a separate plate 8 which is bolted to angles 9 formed on the top and bottom plates and to lugs 10 which are welded to the sides 6.

The base 4 of the mold is provided with a number of projecting plates or fins 11 which are flat at the bottom and combine the functions of a support for the plate and a stiffening at intervals to resist the pressure in the mold; this enables the under side of the mold to be of thinner material than would otherwise be required.

In the form shown the mold is about 20 inches broad and subtends an angle of approximately 60° at a radius of about 6 feet. This mold has four projecting fins 11 and they are provided with transverse diaphragms 12 for stiffening purposes, the parts all preferably being welded together.

The inner wall 5 of the mold carries cores 13 for forming the recesses 2. As seen from Fig. 1, the cores at the ends of the mold are differently shaped from those at the centre thereof in order to enable the mold parts to be moved apart to release the completed block without the danger of injuring the concrete in the recesses or the flanges formed by them. The centre core as shown is substantially rectangular and those on either side are inclined on their outer sides 14, the inclination increasing in the different cores to the outermost one. The latter core is fitted with a wedge member indicated at 98 so as to produce a rectangular recess as shown in Fig. 8.

The cores 13 for the recesses are shown formed of wood and they are each surrounded by a double-walled rubber or like envelope 15 into which compressed air is introduced through delivery tubes 16 from a pressure manifold 17 supplied by a suitable compressor shown diagrammatically at 18.

The concrete is used in a fairly liquid condition so that it will flow easily and in the construction shown it is introduced through two intake openings 19 to which delivery tubes 20, shown diagrammatically, are introduced. The tubes are arranged approximately symmetrically of the mold in cross section.

When the concrete has been introduced it is subjected simultaneously to suction and to pressure and at the same time the mold is vibrated to compact the concrete and assist to free the excess water.

Pressure is applied through the rubber envelopes 15 and suction is applied through an aperture 21, shown in Fig. 2, provided at the centre of the base plate 4.

The aperture is connected to a suitable vacuum pump shown diagrammatically at 22. More than one suction aperture may be provided if desired.

In order to enable the water and air freed from the concrete to be led to the suction outlet the base of the mold is lined with staves 23 preferably of metal, or wood such as teak, which are so shaped at their edges as to leave channels 24 and ducts 25 through which the liquid can drain to the suction orifice 21.

The staves 23 extend across the width of the mold and at their centres they are each provided with a recess 26 to accommodate an arcuate steel band 27 which extends transversely to the staves for the length of the mold and serves as the means by which vibrations are transmitted to the concrete from a suitable vibrator shown diagrammatically at 28.

Vibrations are transmitted to the band 27 by a spring-pressed pin or like member 29 which passes through an aperture 30 in the mold casing 4 and connects the vibrator 28 to the steel band 27. Although only one band is illustrated, more than one may be provided if desired.

On the inner curve of the mold, lining blocks 31 are provided between the cores 13.

In the use of the blocks for tunnel linings they have to be subjected to severe stresses on their sides while the shields are being jacked forward and strong reinforcement is desirable. In the ordinary block which is about 5 inches deep I may provide reinforcement such as shown in Figs. 8 to 10 comprising a reinforcing bar 32 preferably ¾ inch in diameter passing round the block near the inner curve and approximately 1 inch from the sides and ends. This rod is rounded at the corners and preferably welded to make a continuous reinforcement. A number of lighter rods 53 are run along near the outer curve and transverse rods 33 preferably welded to these pass over the tops on the main rods and are provided at distances approximately 4 inches apart. Tubes 34 welded to the reinforcing rods to provide the bolt holes are provided at each side of all recesses and at the ends of the end recesses to enable the successive blocks to be connected together.

I may also provide spiral reinforcement (not shown) particularly near the ends of the block where the recesses have considerable effect in reduction of the strength of the block.

Figs. 3-7 show a modified construction in which a mold for forming one block at a time is arranged so that the block is cast on edge.

The mold shown is for producing arcuate recessed blocks generally similar to the one shown in Figs. 8 to 10. The curved sides of the mold comprise an outer curved plate 60 and an inner curved plate 61.

The top and bottom of the mold are formed by flat plates 62 and 63 respectively which have curved side edges to fit into grooves 64 in the side plates 60 and 61. The mold is closed at each end by a plate 65.

In the mold shown in Figs. 3 and 4 the side plates 60 and 61 are stiffened by vertically extending I-beams 66. These beams 66 carry at their upper and lower ends swinging bolts 67 which serve to secure mold clamps 68 in position.

The whole mold is carried on a curved T-section foot 69 shown in Fig. 3.

The construction shown in Figs. 3-7 also illustrates a modified form of mold interior from that shown in Figs. 1 and 2. The mold cores are subjected to compressed air, but the shape of the recess in this construction is not ultimately defined by an inflatable envelope, but by a metal or other rigid rectangular hat-shaped member 70 which is slidably mounted on a core-piece 71.

A rubber or like inflatable bag-like member 72 is positioned between the core 71 and the hat 70 and it is connected by a lead 73 to a source of compressed air (not shown). On inflation of the bag 72 the hat 70 is pressed further into the mold and compresses the concrete therein. Shoulders 74 on liner blocks 75 serve to limit the travel of the hat 70. This construction is advantageous where recesses of precise dimensions are needed in the molded blocks.

The outer curved mold wall 60 is lined with slats or bars 76 extend from top to bottom of the mold and are grooved at 77 and at 78 to enable excess water and air to drain from the concrete.

A suction aperture 79 is provided in the base of the wall 60 to remove liquid draining through the outer wall and another suction aperture 80 is provided in the bottom wall 63 to remove liquid from the inner wall. The apertures 79 and 80 are connected to one or more suitable vacuum pumps shown diagrammatically at 81.

The liner blocks 75 and similar liner blocks 82 which space the cores apart are formed with slots 83 for the drainage of liquid and they are covered with linen or the like (not shown) to act as a filter. The slots 83 connect with channels indicated at 97 which lead to the suction aperture 80.

The liner bars 76 in the form shown in Figs. 3 and 4 are arranged to take two vibrator steel bands 84 which are operated in a similar manner to the band 27 shown in Figs. 1 and 2 by spring-pressed vibrating pins 85 operated by vibrators diagrammatically shown at 86.

The concrete is introduced at the top of the mold through an intake orifice 87 to which a concrete feed tube 88 is coupled.

Fig. 4 shows the extreme position the cores would occupy during compression of the concrete, the hats 70 being in their innermost position and the members 72 inflated. Fig. 3 shows the hats 70 in their outermost position and the members 72 collapsed.

Figs. 5 and 6 show a mold used for forming a key block. It is generally similar to the mold of Figs. 3 and 4, but as the mold is short, straight wall plates 89 and 90 are used, the curve on the block being obtained by the liners 76 and 75. The end plates 91 are inclined as shown in Fig. 6.

In this mold the stiffeners 66 and clamps 68 are at right angles to those shown in Fig. 3.

Fig. 5 shows the concrete 92 and reinforcement 93 in the mold and it also shows removable tapered cores 94 which are provided at the sides and ends of the blocks to form bolt holes in the flanges. The cores are secured in place by suitable bolts or clamps 95. This arrangement may also be used in Figs. 3 and 4, where holes 96 in the top plate of the mold are shown to take the bolts or clamps 95, the holes 96 shown being of a form to provide a bayonet coupling.

In the embodiment of the invention shown in Figs. 3 and 4 the mold is arranged to cast one block at a time. Where it is found convenient, however, a multiple mold of similar form partitioned to form a plurality of blocks cast side by side, end to end or one above the other may be employed. In some cases the mold may form an annulus to produce arcuate blocks making up a complete circle together.

The mold described with reference to Figs. 11–16 is adapted for manufacturing reinforced concrete blocks A (see Figs. 13 and 16) each of which is provided with a reinforced arcuate tongue C at one end and a quadricircular groove D at the other end so that when the blocks are connected together the tongues enter the grooves in the adjacent blocks and the parts fit tightly and compactly together. The blocks have substantially V-shaped recesses defined by the bottom piece 114 along their lower edges and the vertical reinforcing bars E are bent and extend across the recess. At the top the blocks have flat surfaces defined by the manifold 135 from which the vertical reinforcement extends in the form of substantially V-shaped loops: when the blocks are connected together in the vertical plane the top loops of the reinforcement enter the recesses in the bottoms of the blocks above so that a bar or pin may be passed above the reinforcement of the upper block and through the loops in the lower block to hold the two blocks together.

The blocks are shown with central through-cavities B to reduce weight and to form air insulation, these cavities having drainage holes at the bottom whereby condensation may drain away.

Some of the blocks may be formed with openings therein (not shown) to form window or door openings and the like or parts of same: also sills, thresholds and the like may be formed integral with the blocks.

As shown, the mold consists of side members 110, shaped end sections 111, end members 112, a top 113 and a bottom 114. The shaped end sections 111, the top 113 and the bottom 114 are all arranged between the sides 110 when the mold is erected and are held in place by keys 115 provided on the sides 110 which fit into grooves formed in said members. The keys 115 have tapered portions 116 adapted to slide in tapered grooves in the sides 110.

The inside faces of the sides 110 may be grooved horizontally and vertically at predetermined intervals. Thus portions may be keyed to the mold to block off a section thereof to form a window or like opening or part thereof. In normal use the grooves would be filled with strips of material.

Referring to Fig. 13, the end sections 111 are made up of three pieces 117, 118, 119 for forming the shape of the hook c of the block and of three pieces 121, 122, 123 for forming the grooved portion D of the block. These pieces are held in place against the sides 110 of the mold by bolts 125 and are so shaped that they can be removed piece by piece from the finished block without breaking the contour thereof. These pieces may be provided with co-operating grooves and tongues of known form (not shown) if desired.

Where blocks are to be made with a recess in the bottom, a shaped bottom 114 is provided (Figs. 12, 14, 15) having transverse slots 128 into which the reinforcing steel E is passed; when this is in place fillets 129 are put in the slots 128. The fillets have holes 130 therein and when they are in place a key 131 is run through the recess in the bottom 114 to secure them.

To apply the necessary pressure to the concrete as it sets rubber or rubberized canvas cores 132 in the mold shown are arranged within the mold and have outlet nipples 133 at the top through which fluid pressure is applied. The cores extend throughout the length of the mold and are spaced apart at the bottom by metal, glass or concrete spacers 134 which are held in place by pins 144 passed through the cores. The top of the mold is provided with a pressure manifold 135 (Figs. 15 and 16) in which are arranged ducts 136 adapted to be connected to the nipples 133 and having inlet ports 137 to which the pressure fluid conduits are affixed. Also ducts (not shown) may be arranged in the manifold 135 through which the concrete is subjected to an initial vacuum.

Each core is sealed at the top by a plug 147 fastened in the top of the mold and obturation means (as at 148) are arranged to prevent leakage of pressure at the various joints. Any other usual accessories for such molds may be attached to the top thereof if desired.

The sides 110 of the mold are made to withstand high pressure and each is therefore of double thickness comprising, an inner wall 138 and an outer wall 139 between which are arranged a plurality of struts 140 of metal or other suitable material. If necessary any additional reinforcement may be used.

The mold sides are clamped together by transverse bolts 141 and the ends are reinforced by the members 112 which embrace the outer edges of the sides 110. These members are held in place by clamps 142 at each side one of which is shown in Figs. 11 and 13. The clamps are adapted to be placed in position and tightened by means of bolts 146 which pull the claws thereof against the face of the ends 112. The ends 112 are provided with reinforcing ribs or fins 143 to withstand the pressure in the mold.

In putting the process into effect the bottom 114 is keyed to one of the sides 110 and the reinforcing steel E is bent and put in place with the bottom loop in the slots 128. The fillets 129 are then put in the slots 128 and the key 131 is run through the recess in the bottom 114 to lock them in place. The end pieces 117, 118, 119, 121, 122, 123 are then bolted in position and the cores 132 are positioned with the spacers 134 between the latter at the lower end, the whole lower portion being held in place by the rods 144. The pressure manifold is then fixed to the upper ends of the cores and the nipples 133 and the top 113 is arranged in place. Finally the other side 110 is put in position and the clamps 141 and bolts 145 are tightened up.

After erection of the mold the steel E is subjected to an initial tensile stress by any known means at the top of the mold and the concrete is poured or cast into the mold. The concrete in the mold is then subjected to vibration by any known means and a vacuum is applied by any known means through ducts (not shown) to the concrete to remove excess air and water. The cores are then expanded by initial internal fluid pressure such as by compressed air. The pressure in the cores is then raised gradually to above the normal atmospheric pressure but not greater than 5000 pounds per square inch by fluid pressure such as air, while the temperature is gradually raised above normal atmospheric temperature but not greater than 300° F. preferably by hot air in the said cores. The pressure and temperature are finally reduced slowly to normal atmospheric conditions.

When cold the mold is unbolted and unclamped and one side is removed and then in turn the top, the pressure manifold, the cores, the pieces, 117, 118, 119, 121, 122, 123, the key 131 the bottom 114 and the other side are removed. Finally the fillets 128 are knocked out.

In some cases the sides of the mold may be arranged to overlap the ends thereof or vice versa so that the molds may be adapted for various shapes of blocks.

The whole process is preferably carried out as the molds are passed along a trackway or the like, each stage of the process being performed at separate stations on the route which may be suitably equipped with the necessary apparatus. The wall, floor and other blocks are preferably made in separate batches and any known form of concrete mixing apparatus may be employed preferably adjacent to the position occupied by the molds when the concrete is to be cast. After manufacture the blocks may be left to season and then subjected to tests before being passed out for use.

The molds may be formed to make blocks for wall, floor or other units and may be provided with spacing pieces co-operating with pockets and the like so that the reinforcing steel members may project at any points from the blocks to form loops for locking adjacent blocks together, as will be understood.

Although certain specific features have been described in some detail, it is to be understood that they have been given by way of example only and that the invention includes such appropriate omissions, equivalents or alternatives as come within the spirit of the invention.

While certain parts have been described in specific terms for reference, it is intended that these terms shall be interpreted as generically as the art will permit.

I claim:

1. Apparatus for molding arcuate concrete blocks comprising arcuate mold walls forming the top and bottom of the mold, mold side walls and mold end walls, movable core means carried by the said top mold wall, means operating to move said core means to reduce the effective size of the mold, means positioned inside the bottom wall of said mold permitting liquid to pass therethrough, a source of suction, means connecting the source of suction to the bottom of the mold and means for vibrating the mold.

2. Apparatus for molding arcuate concrete blocks comprising spaced, generally upright, curved mold side walls forming the inner and outer curve of the mold, top and bottom mold walls of curved shape bridging said mold side walls, movable core members on one of said side walls, said movable core members comprising rigid movable hollow members operative to define recesses in said concrete block and inflatable members operative to move said hollow members inwardly of the mold.

3. Apparatus for molding arcuate concrete articles according to claim 2 including core members each extending from said hollow core members to one of said mold walls so as to define bolt holes in the finished concrete block.

4. Apparatus for forming concrete articles comprising a mold, at least one movable core member serving to define the contour of a part of the article, fluid pressure means for producing movement of the said core member to compress the concrete in the mold, a mold lining extending over a part of the mold, passage in the said lining permitting the extraction of liquid therethrough, at least one vacuum pump, means connecting said vacuum pump with said passage means in said mold lining and at least one vibrator member serving to transmit vibrations directly to said mold lining.

5. Apparatus for forming concrete articles comprising mold walls, a source of suction, means connecting said suction source to said mold, means producing vibrating impulses, means transmitting the vibrations of said latter means to said mold, and at least one rigid movable core member shaped to define the contour of part of the article and means for supplying fluid pressure to move the said core member, said movement serving to reduce the effective volume of the mold.

6. Apparatus for molding arcuate concrete blocks comprising arcuate mold walls forming the top and bottom of the mold, mold side walls and mold end walls, movable core means carried by the said top mold wall, means operating to move said core means to reduce the effective size of the mold, a mold lining covering at least a part of said arcuate mold bottom, means defining apertures in said mold lining permitting liquid to pass therethrough, a source of suction, means connecting said source of suction to said apertures, at least one means producing vibrating impulses and means transmitting said vibrating impulses through said arcuate mold bottom directly to said lining.

ARTHUR ERNEST RUEGG.